United States Patent
Endel et al.

(10) Patent No.: US 10,852,019 B2
(45) Date of Patent: Dec. 1, 2020

(54) APPLICATION OF REASONING RULES FOR FAULT DIAGNOSTICS OF CONTROL-RELATED FAULTS

(71) Applicant: Honeywell International Inc., Morris Plains, NJ (US)

(72) Inventors: Petr Endel, Prague (CZ); Jiri Vass, Prague (CZ); Jiri Rojicek, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/630,321

(22) Filed: Jun. 22, 2017

(65) Prior Publication Data
US 2018/0372356 A1 Dec. 27, 2018

(51) Int. Cl.
*F24F 11/30* (2018.01)
*G05B 23/02* (2006.01)
*F24F 110/10* (2018.01)
*F24F 11/52* (2018.01)

(52) U.S. Cl.
CPC .......... *F24F 11/30* (2018.01); *G05B 23/0229* (2013.01); *G05B 23/0235* (2013.01); *G05B 23/0278* (2013.01); *F24F 11/52* (2018.01); *F24F 2110/10* (2018.01)

(58) Field of Classification Search
CPC ........ F24F 11/30; F24F 2110/10; F24F 11/52; G05B 23/0278; G05B 23/0229; G05B 23/0235

USPC .......... 700/276–278; 702/116, 138, 182–183
See application file for complete search history.

(56) References Cited

U.S. PATENT DOCUMENTS

| | | | |
|---|---|---|---|
| 7,213,174 B2 | 5/2007 | Dahlquest et al. | |
| 8,326,790 B2 | 12/2012 | Macek et al. | |
| 2008/0033674 A1* | 2/2008 | Nikovski | G05B 23/0254 702/81 |
| 2013/0304261 A1 | 11/2013 | Vass et al. | |
| 2014/0336787 A1 | 11/2014 | Endel et al. | |
| 2017/0213303 A1* | 7/2017 | Papadopoulos | G06Q 50/163 |
| 2017/0314800 A1* | 11/2017 | Bengea | G05B 13/04 |

OTHER PUBLICATIONS

EP18178894 Extended European Search Report, pp. 8, dated Jun. 20, 2018.

* cited by examiner

*Primary Examiner* — Mohammad Ali
*Assistant Examiner* — Sheela Rao
(74) *Attorney, Agent, or Firm* — Seager Tufte & Wickhem LLP

(57) ABSTRACT

A system controls and monitors a heating, ventilation, and air conditioning (HVAC) system. The system receives raw data from HVAC equipment, controller performance monitoring (CPM) indicators associated with the HVAC equipment, and a set of rules associated with the HVAC equipment. The system processes the CPM indicators and the raw data using the set of rules to generate fault relevancies, and processes the fault relevancies.

19 Claims, 26 Drawing Sheets

Fig. 4A

LEGEND:
- X  INDICATOR EQUALS TO
- X  INDICATOR GREATER OR EQUAL
- ☐  SUM OF THE INDICATORS IN ROWS – LOGICAL AND BETWEEN ELEMENTS

| | PERFORMANCE INDICATORS | | | | | | | | | | | | | | | |
|---|---|---|---|---|---|---|---|---|---|---|---|---|---|---|---|---|
| | | OSCILLATIONDUETOSETPOINT | OSCILLATIONDUETOTUNING | OSCILLATIONDUETODISTURBANCE | OSCILLATIONCANNOTBEDIAGNOSED | OSCILLATIONTRIGGERACTIVETESTING | PVOSC | COMON_BANG_BANG | COOSC | COMON_OSC | COMON_BOUND_VALUE | OFFSETDUETOTUNING | OFFSETDUETODISTURBANCEORDESIGN | FLUCTUATIONS | PREDISTABLECTRLERRORDUETOTUNING | PREDISTABLECTRLERRORDUETODISTURBANCE | PREDISTABLECTRLERRORDIAGNOSISNOTPOSSIBLE |
| EVIDENCES | OSCILATIONDUETOSETPOINT_1 | 100 | | | | | | | | | | | | | | | |
| | OSCILATIONDUETOTUNING_1 | | 100 | | | | | | | | | | | | | | |
| | OSCILATIONDUETODISTURBANCE_1 | | | 100 | | | | | | | | | | | | | |
| | OSCILATIONCANNOTBEDIAGNOSED_1 | 0 | 0 | 0 | 100 | | | | 80 | | | | | | | | |
| | OSCILATIONTRIGGERACTIVETESTING_1 | | | | 0 | 100 | | | | | | | | | | | |
| | OFFSETDUETOTUNING_1 | | | | | | | | | | | 100 | | | | | |
| | OFFSETDUETODISTURBANCE_1 | | | | | | | | | | | | 100 | | | | |
| | FLUCTUATIONS_1 | | | | | | | | | | | | | 100 | | | |
| | PREDISTABLECTRLERRORDUETOTUNING_1 | | | | | | | | | | | | | | 100 | | |
| | PREDISTABLECTRLERRORDUETODISTURBANCE_1 | | | | | | | | | | | | | | | 100 | |
| | PREDISTABLECTRLERRORDIAGNOSISNOTPOSSIBLE_1 | | | | | | | | | | | | | | | | 100 |

| FAULT_NAME | FAULT_DESC | RECOMMENDATION |
|---|---|---|
| OSCPVDUETOSP | THE PROCESS VARIABLE OSCILLATES DUE TO OSCILLATORY SETPOINT. | CHECK THE UPSTREAM CONTROL LOOP FOR OSCILLATIONS AND CONSIDER REDUCING THE UPSTREAM LOOP GAIN. |
| OSCPVDUETODV | THE PROCESS VARIABLE OSCILLATES DUE TO OSCILLATORY DISTURBANCE | CHECK THE DISTURBING SIGNAL FOR OSCILLATIONS AND THEIR CAUSE. |
| OSCPVANDCODUETOTUNING | THE PROCESS VARIABLE AND COMMAND OSCILLATE DUE TO TUNING. | RETUNE THE CONTROLLER (IN THE SIMPLEST CASE TRY TO REDUCE THE P GAIN). |
| OSCLOOP-DIAGNOSISNOTPOSSIBLE | OSCILLATIONS PRESENT IN LOOP, FURTHER DIAGNOSIS IS NOT POSSIBLE | CHECK WHETHER SETPOINT OR DISTURBANCE ARE OSCILLATING. FURTHER DIAGNOSIS IS NOT POSSIBLE. |
| OSCPV-ACTIVETESTINGNEEDED | PROCESS VARIABLE OSCILLATES DUE TO POOR TUNING, HARDWARE FAULT, OR DISTURBANCE. | REDUCE THE P GAIN. IF OSCILLATIONS PERSIST, THEY MIGHT BE CAUSED BY HARDWARE FAULT (BACKLASH OR STICTION) BY EXTERNAL (UNMEASURED) DISTURBANCE, OR LOW A/D CONVERTER / ACTUATOR RESOLUTION. |
| POORPERFORMANCEDUETOTUNING | POOR CONTROL PERFORMANCE DUE TO TUNING LEADING TO ENERGY WASTE/ DISCOMFORT/WEARING OUT OF ACTUATORS. | CONSIDER RETUNING OF CONTROLLER. |
| POORPERFORMANCEDUETODISTURBANCE | POOR CONTROL PERFORMANCE DUE TO TUNING LEADING TO ENERGY WASTE/ DISCOMFORT/WEARING OUT OF ACTUATORS. | INCREASE INTEGRAL TERM, REDUCE EFFECT OF (POSSIBLY OSCILLATING) DISTURBANCE, VERIFY ACTUATOR STATE AND/OR ITS DIMENSIONING. |
| POORPERFORMANCE-DIAGNOSISNOTPOSSIBLE | POOR CONTROL PERFORMANCE (CONTROLLER OUTPUT FLUCTUATES, OR PATTERN IN CONTROLLER ERROR FOUND). | FURTHER DIAGNOSIS IS NOT POSSIBLE. |

Fig. 4B

EVIDENCES SUPPORT OR CANCEL THE FAULTS – EVIDENCES TO FAULTS MAPPING:

LEGEND:
- 1 SUPPORTING EVIDENCE
- -1 CANCELLING EVIDENCE
- IN ROWS – LOGICAL AND BETWEEN ELEMENTS

| FAULTS \ EVIDENCES | OSCILLATIONDUETOSETPOINT_1 | OSCILLATIONDUETOTUNING_1 | OSCILLATIONDUETODISTURBANCE_1 | OSCILLATIONCANNOTBEDIAGNOSED_1 | OSCILLATIONTRIGGERACTIVETESTING_1 | OFFSETDUETOTUNING | OFFSETDUETODISTURBANCE | FLUCTUATIONS | PREDISTABLECTRLERRORDUETOTUNING | PREDISTABLECTRLERRORDUETODISTURBANCE | PREDISTABLECTRLERRORDIAGNOSISNOTPOSSIBLE |
|---|---|---|---|---|---|---|---|---|---|---|---|
| OSCPVDUETOSP | 1 | -1 | -1 | -1 | -1 | | | | | | |
| OSCPVANDCODUETOTUNING | -1 | 1 | -1 | -1 | -1 | | | | | | |
| OSCPVDUETODV | -1 | -1 | 1 | -1 | -1 | | | | | | |
| OSCPV-DIAGNOSISNOTPOSSIBLE | -1 | -1 | -1 | 1 | -1 | | | | | | |
| OSCPV-ACTIVETESTINGNEEDED | -1 | -1 | -1 | -1 | 1 | | | | | | |
| POORPERFORMANCEDUETOTUNING | | | | | | 1 | -1 | -1 | 1 | -1 | -1 |
| POORPERFORMANCEDUETODISTURBANCE | | | | | | -1 | 1 | -1 | -1 | 1 | -1 |
| POORPERFORMANCE-DIAGNOSISNOTPOSSIBLE | | | | | | -1 | -1 | 1 | -1 | -1 | 1 |

Fig. 4C

```xml
<?xml version="1.0" encoding="UTF-8"?>
<datasource type="Text File">
    <files useEntityNameInOutputFiles="true" entityName="" validityFile="" dataFile=""/>
    <dateRange>
        <startDate seconds="" minutes="" hours="" day="" month="" year=""/>
        <endDate seconds="" minutes="" hours="" day="" month="" year=""/>
    </dateRange>
    <timestamp pattern="dd/MMM/yy HH:mm:ss" enabled="false" columnName="Timestamp"/>
    <datapoints autoDisable="true"/>

<!-- VIRTUAL points - CPM indicators -->

<datapoint evidence_name="PVosc" abbreviation="PVosc"/>
    <datapoint evidence_name="SPosc" abbreviation="SPosc"/>
    <datapoint evidence_name="DVosc" abbreviation="DVosc"/>
    <datapoint evidence_name="COosc" abbreviation="COosc"/>
    <datapoint evidence_name="COmon_bang_bang" abbreviation="COmon_bang_bang"/>
    <datapoint evidence_name="COmon_bound_value" abbreviation="COmon_bound_value"/>
    <datapoint evidence_name="COmon_osc" abbreviation="COmon_osc"/>
    <datapoint evidence_name="OscilationDueToTuning" abbreviation="OscilationDueToTuning"/>
    <datapoint evidence_name="OscilationDueToSetpoint" abbreviation="OscilationDueToSetpoint"/>
```

*Fig. 6A*

```xml
    abbreviation="OscilationDueToSetpoint"/>
<datapoint evidence_name="OscilationDueToDisturbance"
    abbreviation="OscilationDueToDisturbance"/>
<datapoint evidence_name="OscilationCannotBeDiagnosed"
    abbreviation="OscilationCannotBeDiagnosed"/>
<datapoint evidence_name="OscilationTriggerActiveTesting"
    abbreviation="OscilationTriggerActiveTesting"/>
<datapoint evidence_name="OffsetDueToTuning" abbreviation="OffsetDueToTuning"/>
<datapoint evidence_name="OffsetDueToDisturbanceOrDesign"
    abbreviation="OffsetDueToDisturbanceOrDesign"/>
<datapoint evidence_name="Fluctuations" abbreviation="Fluctuations"/>
<datapoint evidence_name="PredictableCtrlErrorDueToTuning"
    abbreviation="PredictableCtrlErrorDueToTuning"/>
<datapoint evidence_name="PredictableCtrlErrorDueToDisturbance"
    abbreviation="PredictableCtrlErrorDueToDisturbance"/>
<datapoint evidence_name="PredictableCtrlErrorDiagnosisNotPossible"
    abbreviation="PredictableCtrlErrorDiagnosisNotPossible"/>
</datapoints>
</datasource>
```

Fig.6B

```xml
<?xml version="1.0" encoding="UTF-8"?>
<allSymptoms enabled="true"/>
  <symptomGroup name="Group8" id="1">
    <rules>
      <rule enabled="true" threshold="eps_round" formula="OscilationDueToTuning"/>
    </rules>
    <symptoms>
      <symptom enabled="true" evidence_friendly_name="Oscillation Due To Tuning" evidence_name="OscilationDueToTuning_1">
        <conditions>
          <condition value="Result Equals 100"/>
        </conditions>
      </symptom>
    </symptoms>
  </symptomGroup>
  <symptomGroup name="Group9" id="2">
    <rules>
      <rule enabled="true" threshold="eps_round" formula="OscilationDueToSetpoint"/>
    </rules>
    <symptoms>
      <symptom enabled="true" evidence_friendly_name="Oscillation Due To Setpoint"
```

Fig. 7A

```xml
evidence_name="OscilationDueToSetpoint_1">
  <conditions>
    <condition value="Result Equals 100"/>
  </conditions>
</symptom>
</symptoms>
</symptomGroup>
<symptomGroup name="Group10" id="3">
  <rules>
    <rule enabled="true" threshold="eps_round" formula="OscilationDueToDisturbance"/>
  </rules>
  <symptoms>
    <symptom enabled="true" evidence_friendly_name="Oscillation Due To Disturbance" evidence_name="OscilationDueToDisturbance_1">
      <conditions>
        <condition value="Result Equals 100"/>
      </conditions>
    </symptom>
  </symptoms>
</symptomGroup>
```

Fig. 7B

```xml
<symptomGroup name="Group11" id="4">
    <rules>
        <rule enabled="true" threshold="eps_round" formula="OscilationCannotBeDiagnos
            + PVosc + COmon_bang_bang + COosc + COmon_osc +
            COmon_bound_value"/>
        <rule enabled="true" threshold="eps_round" formula="OscilationDueToTuning"/>
        <rule enabled="true" threshold="eps_round" formula="OscilationDueToSetpoint"/>
        <rule enabled="true" threshold="eps_round"
            formula="OscilationDueToDisturbance"/>
        <rule enabled="true" threshold="eps_round"
            formula="OscilationTriggerActiveTesting"/>
    </rules>
    <symptoms>
        <symptom enabled="true" evidence_friendly_name="Oscillation Detected - Cannot Be
            Diagnosed" evidence_name="OscilationCannotBeDiagnosed_1">
            <conditions>
                <condition value="Result GreaterOrEqual 80"/>
                <!-- because some of the indicators can have value -1 ("don't know") -->
                <condition value="Result Equals 0"/>
                <condition value="Result Equals 0"/>
                <condition value="Result Equals 0"/>
```

Fig. 7C

```xml
            <condition value="Result Equals 0"/>
          </conditions>
        </symptom>
      </symptoms>
    </symptomGroup>
    <symptomGroup name="Group12" id="5">
      <rules>
        <rule enabled="true" threshold="eps_round"
              formula="OscilationTriggerActiveTesting"/>
      </rules>
      <symptoms>
        <symptom enabled="true" evidence_friendly_name="Oscillation Detected - Active
                 Test Needed" evidence_name="OscilationTriggerActiveTesting_1">
          <conditions>
            <condition value="Result Equals 100"/>
          </conditions>
        </symptom>
      </symptoms>
    </symptomGroup>
    <symptomGroup name="Group13" id="6">
      <rules>
```

*Fig. 7D*

```
<rule enabled="true" threshold="eps_round" formula="OffsetDueToTuning"/>
</rules>
<symptoms>
    <symptom enabled="true" evidence_friendly_name="Offset Due To Tuning Status"
evidence_name="OffsetDueToTuning_1">
        <conditions>
            <condition value="Result Equals 100"/>
        </conditions>
    </symptom>
</symptoms>
</symptomGroup>
<symptomGroup name="Group14" id="7">
    <rules>
        <rule enabled="true" threshold="eps_round"
formula="OffsetDueToDisturbanceOrDesign"/>
    </rules>
    <symptoms>
        <symptom enabled="true" evidence_friendly_name="Offset Due To Disturbance of
Design Status" evidence_name="OffsetDueToDisturbanceOrDesign_1">
            <conditions>
                <condition value="Result Equals 100"/>
```

Fig. 7E

```
    </conditions>
   </symptom>
  </symptoms>
 </symptomGroup>
 <symptomGroup name="Group15" id="8">
  - <rules>
     <rule enabled="true" threshold="eps_round" formula="Fluctuations"/>
    </rules>
  <symptoms>
   <symptom enabled="true" evidence_friendly_name="Present Value Fluctuations Around Setpoint" evidence_name="Fluctuations_1">
    <conditions>
     <condition value="Result Equals 100"/>
    </conditions>
   </symptom>
  </symptoms>
 </symptomGroup>
 <symptomGroup name="Group16" id="9">
  - <rules>
     <rule enabled="true" threshold="eps_round" formula="PredictableCtrlErrorDueToTuning"/>
```

*Fig. 7H*

```xml
</rules>
<symptoms>
    <symptom enabled="true" evidence_friendly_name="Predictable Control Error due to Tuning" evidence_name="PredictableCtrlErrorDueToTuning_1">
        <conditions>
            <condition value="Result Equals 100"/>
        </conditions>
    </symptom>
</symptoms>
</symptomGroup>
<symptomGroup name="Group17" id="10">
    <rules>
        <rule enabled="true" threshold="eps_round" formula="PredictableCtrlErrorDueToDisturbance"/>
    </rules>
    <symptoms>
        <symptom enabled="true" evidence_friendly_name="Predictable Control Error due to Disturbance" evidence_name="PredictableCtrlErrorDueToDisturbance_1">
            <conditions>
                <condition value="Result Equals 100"/>
```

Fig. 7G

```xml
    </conditions>
   </symptom>
  </symptoms>
 </symptomGroup>
 <symptomGroup id="11" name="Group18">
  <rules>
   <rule enabled="true" threshold="eps_round"
    formula="PredictableCtrlErrorDiagnosisNotPossible"/>
  </rules>
  <symptoms>
   <symptom enabled="true"
    evidence_name="PredictableCtrlErrorDiagnosisNotPossible_1"
    evidence_friendly_name="Predictable Control Error - Diagnosis Not Possible">
    <conditions>
     <condition value="Result Equals 100"/>
    </conditions>
   </symptom>
  </symptoms>
 </symptomGroup>
</allSymptoms>
```

Fig. 7H

```xml
<?xml version="1.0"?>
<allFaults>
  <faultGroup id="11" name="Control Performance Monitoring Faults">
    <faults>
      <!-- Oscillation Detection and Diagnosis -->
      <fault recommendation="Check the upstream control loop for oscillations and consider reducing the upstream loop gain." severity_level_name="Medium" fault_desc="The process variable oscillates due to oscillatory setpoint." fault_friendly_name="Oscillating Process Variable due to Oscillatory Setpoint" fault_name="OscPVDueToSP" fault_type_name="CPM"/>
      <fault recommendation="Check the disturbing signal for oscillations and their cause." severity_level_name="Medium" fault_desc="The process variable oscillates due to oscillatory disturbance." fault_friendly_name="Oscillating Process Variable due to Oscillatory Disturbance" fault_name="OscPVDueToDV" fault_type_name="CPM"/>
      <fault recommendation="Retune the controller (in the simplest case try to reduce the P gain)." severity_level_name="Medium" fault_desc="The process variable and command oscillate due to tuning." fault_friendly_name="Oscillating Process Variable and Command" fault_name="OscPVandCODueToTuning" fault_type_name="CPM"/>
      <fault recommendation="Check whether setpoint or disturbance are oscillating. Further diagnosis is not possible." severity_level_name="Medium"
```

*Fig. 8A* fault_desc="Oscillations present in loop, further diagnosis is not possible."
fault_friendly_name="Oscillating Loop, Diagnosis Not Possible"
fault_name="OscLoop-DiagnosisNotPossible" fault_type_name="CPM"/>
<fault_recommendation="Reduce the P gain. If oscillations persist, they might be caused by hardware fault (backlash or stiction), by external (unmeasured) disturbance, or low A/D converter / actuator resolution."
severity_level_name="Medium" fault_desc="Process variable oscillates due to poor tuning, hardware fault, or disturbance." fault_friendly_name="Oscillating Process Variable, Active Testing Needed" fault_name="OscPV-ActiveTestingNeeded" fault_type_name="CPM"/>
<!-- Performance Indices -->
<fault_recommendation="Consider retuning of controller."
severity_level_name="Medium" fault_desc="Poor control performance due to tuning leading to energy waste/discomfort/wearing out of actuators."
fault_friendly_name="Poor Control Performance due to Tuning"
fault_name="PoorPerformanceDueToTuning" fault_type_name="CPM"/>
<fault_recommendation="Increase integral term, reduce effect of (possibly oscillating) disturbance, verify actuator state and/or its dimensioning."
severity_level_name="Medium" fault_desc="Poor control performance due to disturbance leading to energy waste/discomfort/wearing out of actuators."
fault_friendly_name="Poor Control Performance due to Disturbance"
fault_name="PoorPerformanceDueToDisturbance" fault_type_name="CPM"/>

*Fig. 8B*

```
<fault recommendation="Further diagnosis is not possible."
severity_level_name="Medium" fault_desc="Poor control performance
(controller output fluctuates, or pattern in controller error found)."
fault_friendly_name="Poor Control Performance, Diagnosis Not Possible"
fault_name="PoorPerformance-DiagnosisNotPossible"
fault_type_name="CPM"/>
    </faults>
  </faultGroup>
</allFaults>
```

Fig. 8C

```xml
<?xml version="1.0"?>
<mapping includeInStatistics="false"/>
<fault fault_name="OscPVDueToSP">
    <evidence causality="1" evidence_name="OscilationDueToSetpoint_1"/>
    <evidence causality="-1" evidence_name="OscilationDueToDisturbance_1"/>
    <evidence causality="-1" evidence_name="OscilationDueToTuning_1"/>
    <evidence causality="-1" evidence_name="OscilationCannotBeDiagnosed_1"/>
    <evidence causality="-1" evidence_name="OscilationTriggerActiveTesting_1"/>
</fault>
<fault fault_name="OscPVDueToDV">
    <evidence causality="1" evidence_name="OscilationDueToDisturbance_1"/>
    <evidence causality="-1" evidence_name="OscilationDueToSetpoint_1"/>
    <evidence causality="-1" evidence_name="OscilationDueToTuning_1"/>
    <evidence causality="-1" evidence_name="OscilationCannotBeDiagnosed_1"/>
    <evidence causality="-1" evidence_name="OscilationTriggerActiveTesting_1"/>
</fault>
<fault fault_name="OscPVandCODueToTuning">
    <evidence causality="1" evidence_name="OscilationDueToTuning_1"/>
    <evidence causality="-1" evidence_name="OscilationDueToSetpoint_1"/>
```

*Fig. 9A*

```xml
    <evidence causality="-1" evidence_name="OscilationDueToDisturbance_1"/>
    <evidence causality="-1" evidence_name="OscilationCannotBeDiagnosed_1"/>
    <evidence causality="-1" evidence_name="OscilationTriggerActiveTesting_1"/>
</fault>
<fault fault_name="OscPV-ActiveTestingNeeded">
    <evidence causality="1" evidence_name="OscilationTriggerActiveTesting_1"/>
    <evidence causality="-1" evidence_name="OscilationDueToSetpoint_1"/>
    <evidence causality="-1" evidence_name="OscilationDueToDisturbance_1"/>
    <evidence causality="-1" evidence_name="OscilationDueToTuning_1"/>
    <evidence causality="-1" evidence_name="OscilationCannotBeDiagnosed_1"/>
</fault>
<fault fault_name="OscLoop-DiagnosisNotPossible">
    <evidence causality="1" evidence_name="OscilationCannotBeDiagnosed_1"/>
    <evidence causality="-1" evidence_name="OscilationDueToSetpoint_1"/>
    <evidence causality="-1" evidence_name="OscilationDueToDisturbance_1"/>
    <evidence causality="-1" evidence_name="OscilationDueToTuning_1"/>
    <evidence causality="-1" evidence_name="OscilationTriggerActiveTesting_1"/>
</fault>
```

Fig. 9B

```xml
<fault fault_name="PoorPerformanceDueToTuning">
    <evidence causality="1" evidence_name="OffsetDueToTuning_1"/>
    <evidence causality="1" evidence_name="PredictableCtrlErrorDueToTuning_1"/>
    <evidence causality="-1" evidence_name="OffsetDueToDisturbanceOrDesign_1"/>
    <evidence causality="-1" evidence_name="PredictableCtrlErrorDueToDisturbance_1"/>
    <evidence causality="-1"
        evidence_name="PredictableCtrlErrorDiagnosisNotPossible_1"/>
    <evidence causality="-1" evidence_name="Fluctuations_1"/>
</fault>
<fault fault_name="PoorPerformanceDueToDisturbance">
    <evidence causality="1" evidence_name="OffsetDueToDisturbanceOrDesign_1"/>
    <evidence causality="1" evidence_name="PredictableCtrlErrorDueToDisturbance_1"/>
    <evidence causality="-1" evidence_name="OffsetDueToTuning_1"/>
    <evidence causality="-1" evidence_name="PredictableCtrlErrorDueToTuning_1"/>
    <evidence causality="-1"
        evidence_name="PredictableCtrlErrorDiagnosisNotPossible_1"/>
    <evidence causality="-1" evidence_name="Fluctuations_1"/>
```

Fig. 9C

```xml
</fault>
<fault fault_name="PoorPerformance-DiagnosisNotPossible">
    <evidence causality="1" evidence_name="PredictableCtrlErrorDiagnosisNotPossible_1"/>
    <evidence causality="1" evidence_name="Fluctuations_1"/>
    <evidence causality="-1" evidence_name="PredictableCtrlErrorDueToDisturbance_1"/>
    <evidence causality="-1" evidence_name="PredictableCtrlErrorDueToTuning_1"/>
    <evidence causality="-1" evidence_name="OffsetDueToTuning_1"/>
    <evidence causality="-1" evidence_name="OffsetDueToDisturbanceOrDesign_1"/>
</fault>
</mapping>
```

*Fig. 9D*

APPLICATION OF REASONING RULES FOR FAULT DIAGNOSTICS OF CONTROL-RELATED FAULTS

TECHNICAL FIELD

The present disclosure relates to heating, ventilation, and air conditioning (HVAC) fault detection and diagnosis systems.

BACKGROUND

Many businesses, for example supermarkets and grocery stores, operate at hundreds of different sites. Unfortunately, many of these sites experience faults in their heating, ventilation, and air conditioning (HVAC) equipment. These faults cause thermal discomfort in the store (that is, shoppers and staff are too cold or too hot), which reduces the volume of sales and the overall shopping experience (people are shopping for a shorter time or even choose a competitor's store). Some HVAC faults lead to a temporary shutdown of a store (e.g. lack of hot water), which has a detrimental effect on sales and damages the store's reputation.

BRIEF DESCRIPTION OF THE DRAWINGS

FIGS. 4A, 4B, and 4C illustrate sets of reasoning rules used to detect and diagnose faults in an HVAC system.

FIGS. 6A and 6B are an example of an XML file including virtual points.

FIGS. 7A, 7B, 7C, 7D, 7E, 7F, 7G, and 7H illustrate an example of an XML file that includes formulas that use virtual points to define symptoms.

FIGS. 8A, 8B, and 8C are an example of an XML file that associates a fault to an action.

FIGS. 9A, 9B, 9C, and 9D are an example of an XML file that maps symptoms to faults including supporting and canceling symptoms for each fault.

DETAILED DESCRIPTION

Figure 1:
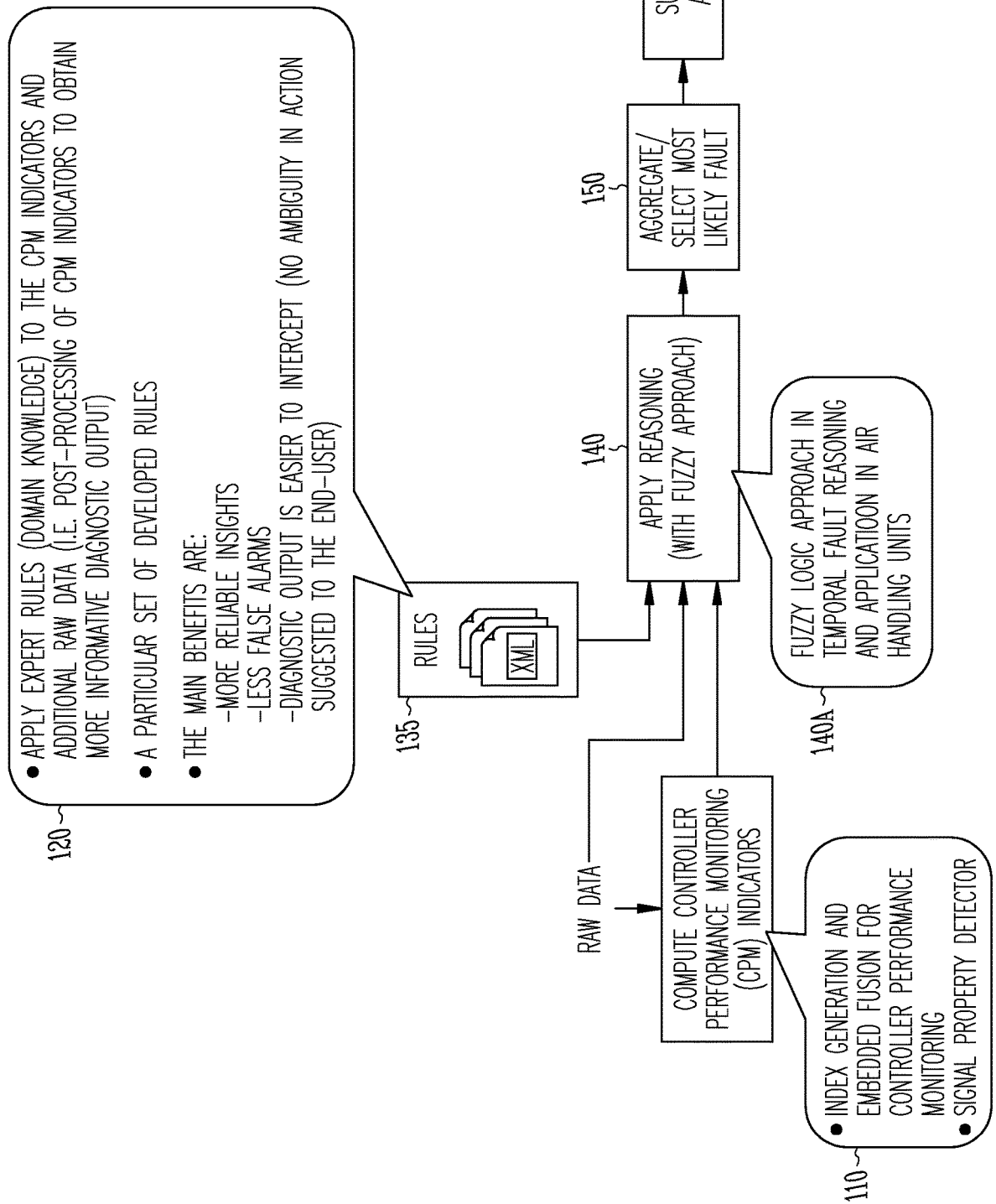
FIG. 1 is a block diagram illustrating a system and process to detect faults in a HVAC system.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

In response to the heating, ventilation, and air conditioning (HVAC) problems outlined above, one or more embodiments of this disclosure address HVAC faults that manifest themselves by poor behavior of HVAC systems from the control perspective. These faults are caused either by a problem in the control strategy (e.g., poor tuning of controllers or oscillating setpoints), or by hardware faults (e.g. a stuck valve, a leaky valve, or a stuck damper). The most common faults are oscillations of control loops (i.e., modulating actuators are constantly opening and closing), frequent ON/OFF switching (i.e., digital actuators are constantly opening and closing), bang-bang control, and permanent setpoint offset.

It can be important to correctly diagnose such HVAC faults and eliminate these faults as soon as possible for several reasons. These faults affect all HVAC equipment with motorized actuators, e.g. valves (modulating or ON/OFF), dampers, and fans. These faults significantly increase the risk of unexpected malfunction of actuators and can thus cause unavailability of the entire HVAC system (e.g., the air handling unit (AHU) and the calorifier). The faults also reduce the life expectancy of actuators. These faults are hidden, that is, they negatively affect the HVAC system performance for a very long time (several months or years) without the owners of the HVAC system being aware of them. This situation then persists until the occurrence of a complete failure of one or more mechanical components of the HVAC system. System analysts do not have the time and resources to analyze the data manually, or the skills to identify these types of faults. These faults result in a waste of energy (e.g., motorized actuators constantly in movement), and complete failure causes discomfort in buildings.

A purpose of one or more embodiments of this disclosure is to automatically diagnose the above-mentioned faults. For example, one or more embodiments address the frequent ON/OFF switching of an AHU valve. Such frequent ON/OFF switching of an AHU valve causes oscillations in supply air temperature, and also causes a premature wearing out of the valve. Another example is an oscillating room temperature, which can be caused by an oscillating supply air temperature. To address these issues, an embodiment continuously diagnoses HVAC control loops and provides data and insights that are easy to interpret and to take action on, and that are reliable (with a minimum of false alarms). Embodiments are not limited to retail stores of a specific type, but rather are also applicable to other types of commercial buildings, such as office buildings, hotels, schools, and hospitals. Although the examples provided herein are based on historical data from HVAC equipment, the several embodiments are applicable to other types of systems with local controllers and actuators.

Previous work in the automated fault detection and diagnosis (AFDD) area can be found in U.S. Patent Publication Nos. 20140336787 A1 and US 20130304261 A1, which describe a set of specialized indicators for detecting the control-related faults, and which are incorporated herein by reference. Such indicators were designed to be recursively computed with low memory requirements. However, these methods have limitations due to constraints given on the original prototypes (methods were required to be simple enough to run in a controller). Later on however, market requirements shifted to compute these indicators in the cloud. Moreover, research has identified deficiencies of these previous methods. Therefore, embodiments of the current disclosure result in a significant improvement in the quality of the results (i.e., the new results are more reliable, easier to interpret, have no or smaller ambiguity, and provide clear instructions to the end user). The embodiments of this disclosure are based on post-processing of indicators by means of expert rules (domain knowledge) combined with additional raw data. Another advantage is that these rules can be applied in a smart way (e.g., a fuzzy approach as outlined in U.S. Pat. No. 8,326,790 B2, which is incorporated herein by reference). Consequently, the embodiments disclosed herein are very powerful and valuable.

Previous methods can have some shortcomings. For example, the diagnosis can have multiple candidate faults, which can be in conflict or even in contradiction to each other. Also, the diagnostic output can be unstable and quickly change over short time intervals (e.g. minutes or hours). Consequently, the end user is flooded with information, which can consist of too much information without the needed information, and the decision about the fault (and thus about a corrective action) is difficult to make. In summary, the diagnostic results tend to be unreliable and difficult to interpret.

One or more embodiments differ from previous methods by applying expert rules to the performance indicators and raw data, and using a set of reasoning rules that represents domain knowledge. In an embodiment, the actual logic is contained in the expert rules themselves, and are stored in files such as XML files. Specifically, controller performance indicators (from the raw input data) are computed according to previously known methods (such as in the previously mentioned U.S. Patent Publication Nos. 20140336787 A1 and US 20130304261 A). Referring to FIG. 1, these previous methods include index generation and embedded fusion for controller performance monitoring, and signal property detection (110). At 120, expert rules (domain knowledge) are applied to the computed controller performance indicators and additional raw data (that is, a post-processing of the controller performance indicators to obtain more informative diagnostic output). The particular set of rules 135 was developed by the inventors. An example of such rules are illustrated in FIGS. 4A, 4B, and 4C, and are discussed in detail in connection with FIGS. 5A, 5B, and 5C. Thereafter, reasoning 140 is applied (i.e., to compute symptoms (also can be referred to as evidence)) to the performance indicators and the raw data. This reasoning can include a fuzzy logic approach 140A in temporal fault reasoning and application in AHUs. A mapping is then applied between the symptoms and faults (a symptom (or one piece of evidence) can act as a supporting symptom for one fault and act as a cancelling symptom for other faults). The system then aggregates or selects the most likely fault at 150, and initiates a corrective action and/or suggests such a corrective to the user at 160.

The set of reasoning rules is represented by a list of performance indicators, symptoms (evidences), faults, and mapping between the symptoms and the faults. Extension of this ruleset can be based on considering other raw data points that describe the state of the equipment (e.g. fan status of air handling unit, stating whether the unit was running or not). By design, the faults are "competing" so that the most probable fault achieves the highest fault relevancy. As a result, the final diagnosis has the advantages that it is more informative (no ambiguity) and better understandable by humans, more reliable with a lower number of false alarms, and more robust to missing or invalid data points.

Figure 2:
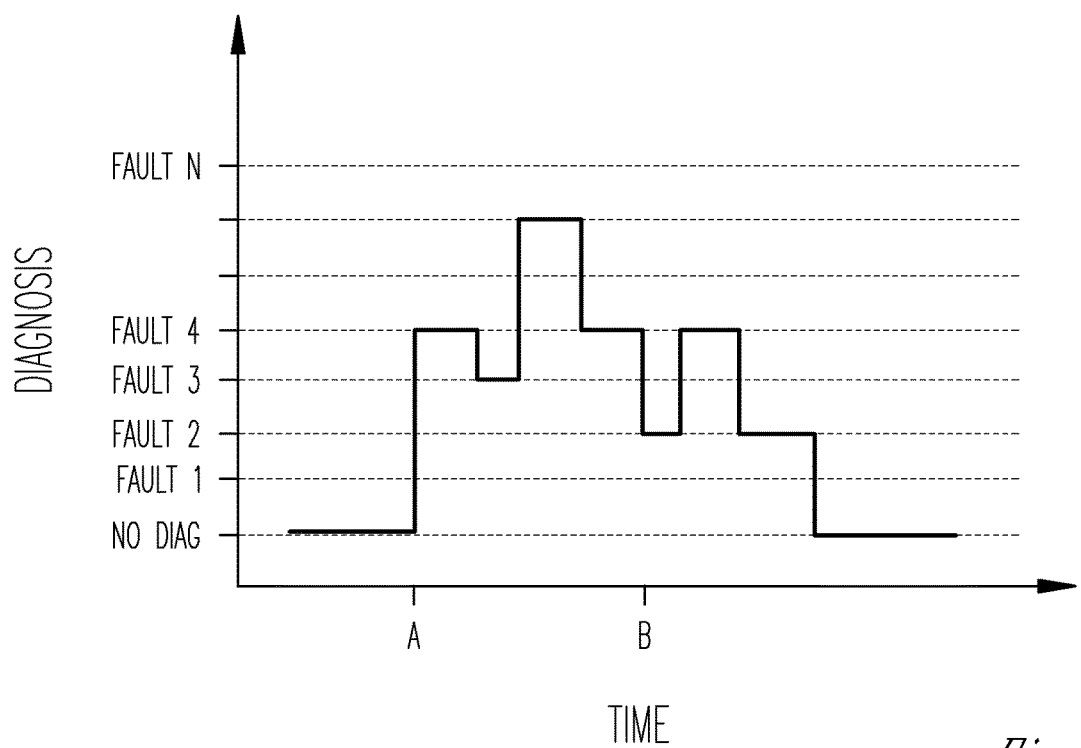
FIG. 2 illustrates an HVAC diagnostic method using only control performance monitoring indicators.
Figure 3:
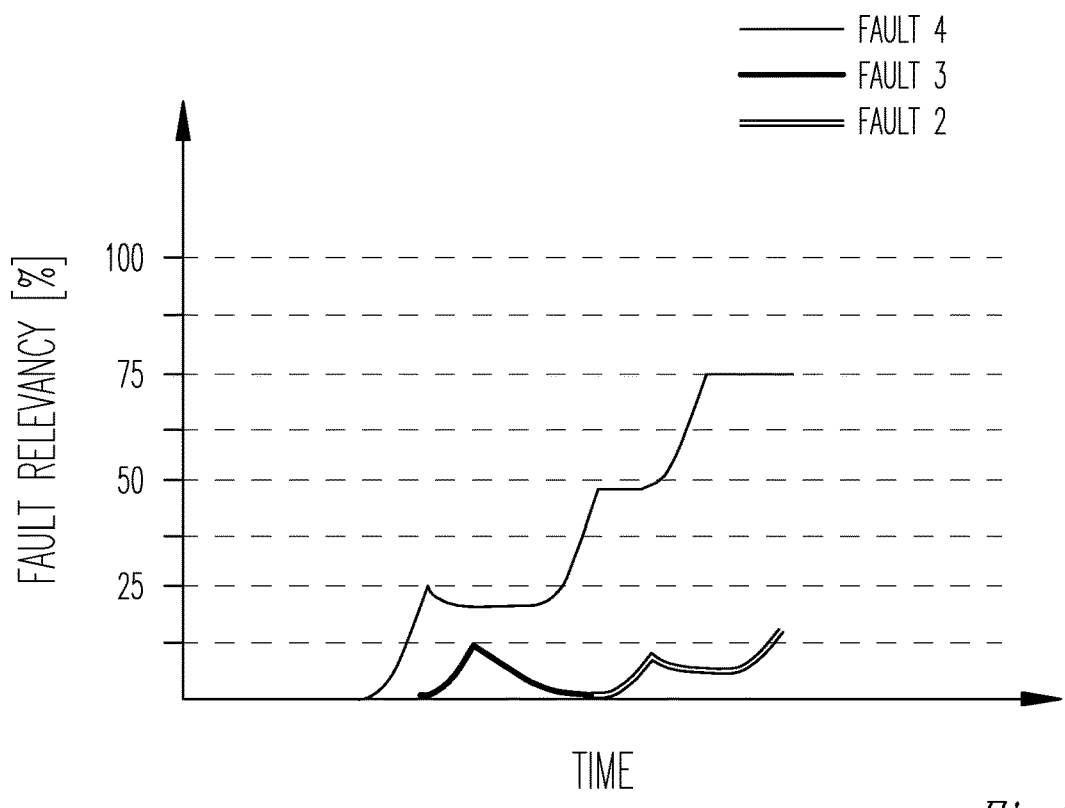
FIG. 3 illustrates an HVAC diagnostic method using post-processing rules.

As illustrated in FIG. 2, the previous method of diagnostics by CPM indicators only runs in a very short window, and at each time instant only a single fault is flagged (the most problematic fault at that time). For example, referring to FIG. 2, only fault number 4 is flagged at time A and only fault number 2 is flagged at time B. The diagnosis is therefore unstable, because it reports a specific fault at one time instant and another fault at a later time instant. This switching between and among faults is confusing to the user. Diagnostic output of the present disclosure (that is the application of post-processing rules) is illustrated in FIG. 3. The method uses supporting and cancelling symptoms to influence each fault's relevancy, and the most probable fault has the highest relevancy. For example, FIG. 3 clearly shows that fault number 4 has the highest relevancy. The diagnosis in FIG. 3 is more easily understood, permits more decisive actions, is more reliable with less false alarms, and more robust to missing or invalid data points.

Figure 5A:
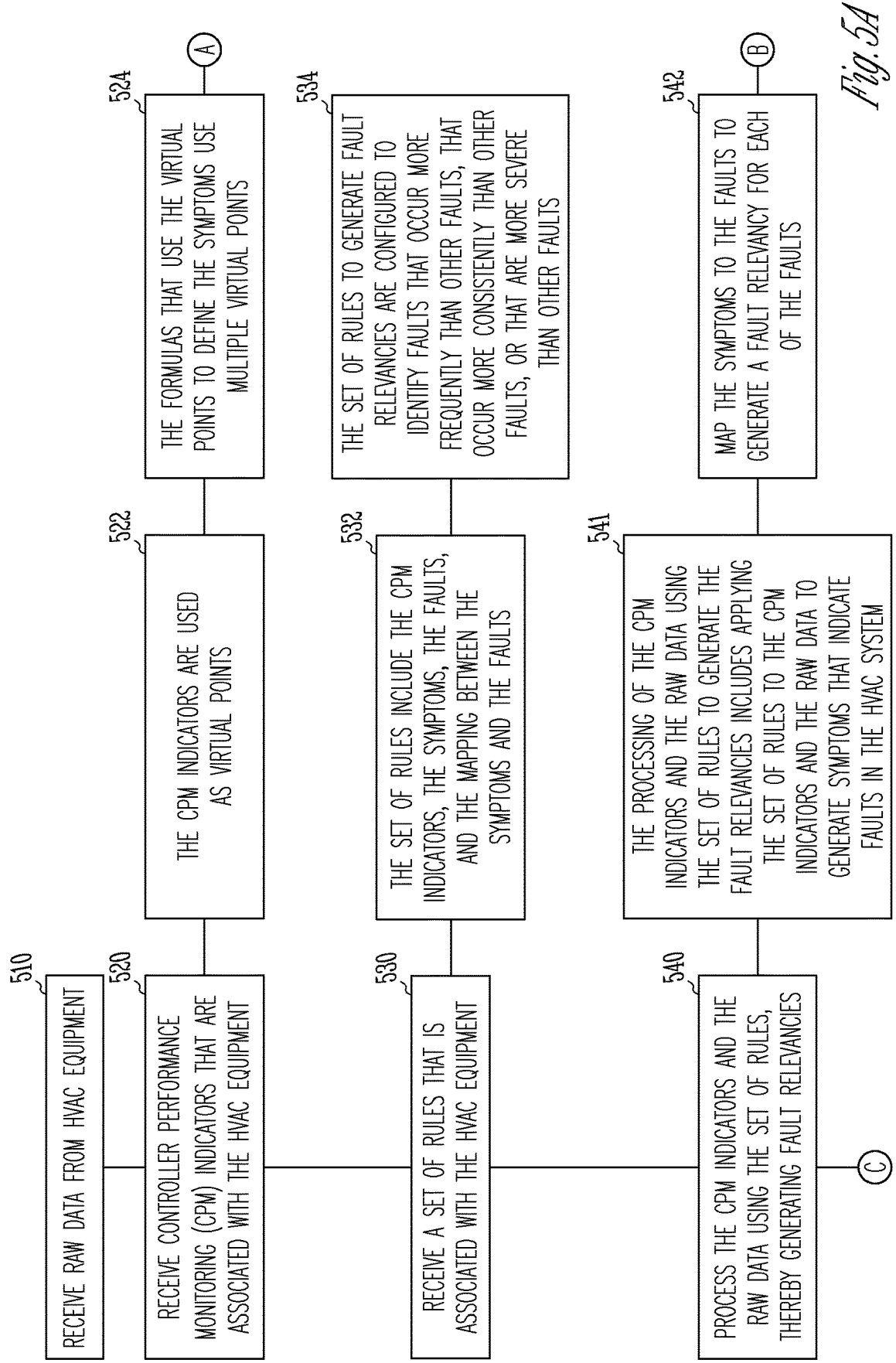
FIGS. 5A, 5B, and 5C are a block diagram illustrating operations and features of a system to detect and diagnose faults in an HVAC system.
Figure 5B:
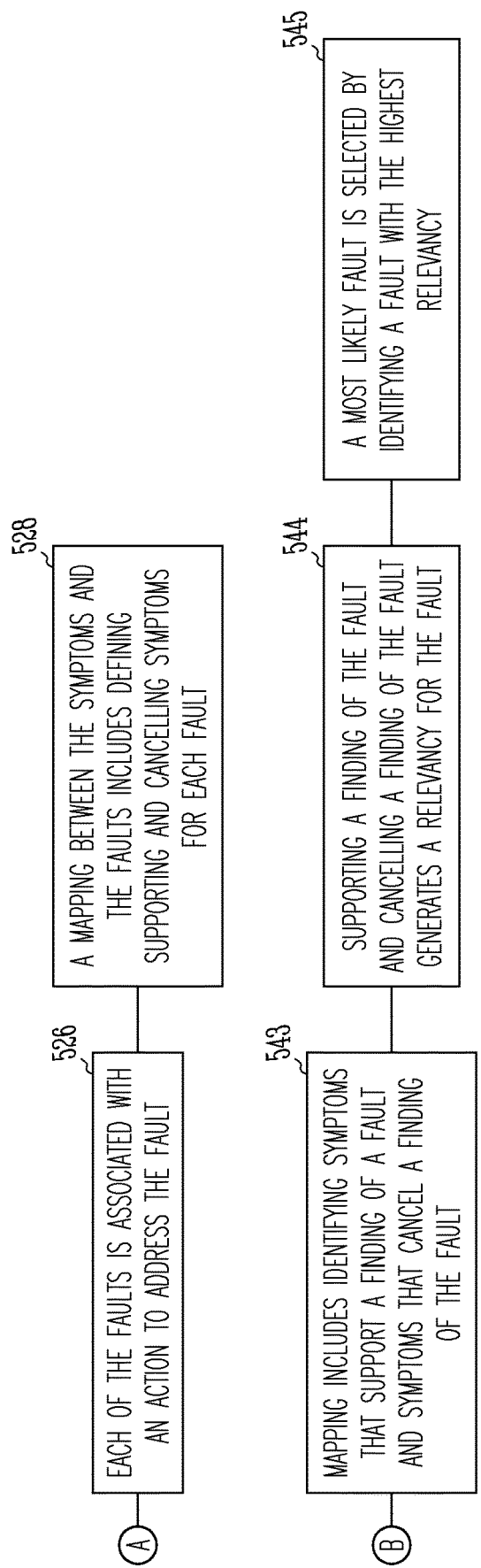
Figure 5C:
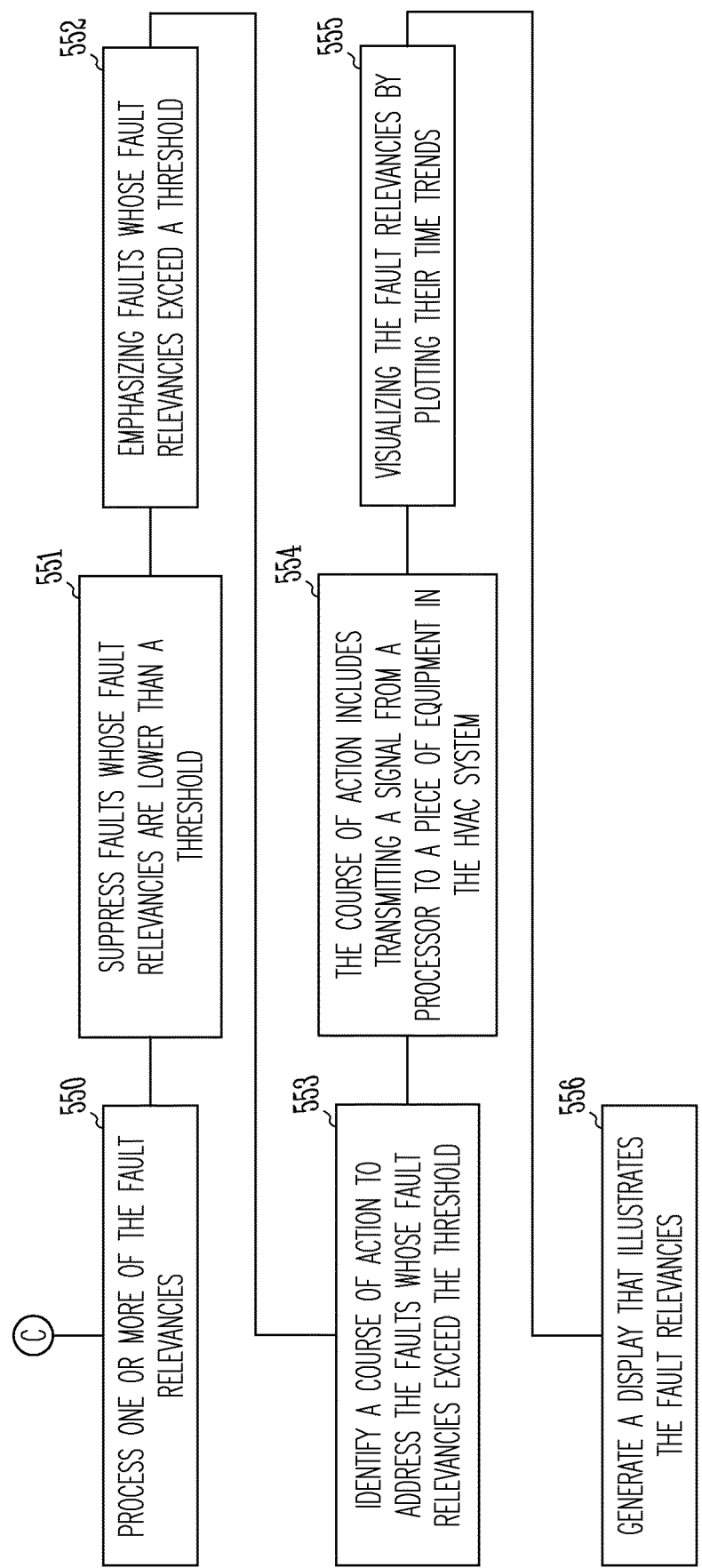

FIGS. 5A, 5B, and 5C are a block diagram illustrating features and operations of a method for fault detection and diagnosis in an HVAC system. FIGS. 5A, 5B, and 5C include a number of process blocks 510-556. Though arranged somewhat serially in the example of FIGS. 5A, 5B, and 5C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 5A, 5B, and 5C, at 510, a process to control and monitor a heating, ventilation, and air conditioning (HVAC) system includes receiving raw data from HVAC equipment. These raw data can include such information as setpoints, outside air temperature, ambient room temperature, valve status and position, etc. At 520, the process receives controller performance monitoring (CPM) indicators that are associated with the HVAC equipment. As indicated at 522, the CPM indicators include a definition of virtual points, and formulas employing the virtual points to define symptoms in the system. An example of an XML file including virtual points is illustrated in FIGS. 6A and 6B, and an example of formulas that use the virtual points to define symptoms are illustrated in FIGS. 7A, 7B, 7C, 7D, 7E, 7F, 7G, and 7H. The same information as in FIGS. 7A, 7B, 7C, 7D, 7E, 7F, 7G, and 7H is illustrated in a form better readable by humans in FIG. 4A. Additionally, as indicated at 524, the formulas that use the virtual points to define the symptoms use multiple virtual points. The use of multiple points helps ensure robustness to missing or invalid data points. As indicated at 526, each of the faults is associated with an action to address the fault. An example of such an association of a fault to an action to address a fault is illustrated in FIGS. 8A, 8B, and 8C. The same information as in FIGS. 8A, 8B, and 8C is illustrated in a form better readable by humans in FIG. 4B. At 528, a mapping between the symptoms and the faults includes defining supporting and cancelling symptoms for each fault. An example of this mapping is illustrated in FIGS. 9A, 9B, 9C, and 9D. The same information as in FIGS. 9A, 9B, 9C, and 9D is illustrated in a form better readable by humans in FIG. 4C.

At 530, the process receives a set of rules that is associated with the HVAC equipment. As indicated at 532, the set of rules include the CPM indicators, the symptoms, the faults, and the mapping between the symptoms and the faults. At 534, the set of rules to generate fault relevancies are configured to identify faults that occur more frequently than other faults, that occur more consistently than other faults, or that are more severe than other faults. This feature improves upon the prior art wherein it was difficult to identify which fault was the most important fault (See e.g., FIG. 2). This feature can take the form of an easy to read plot of the faults as is illustrated in FIG. 3.

At 540, the CPM indicators and the raw data are processed using the set of rules, which generates fault relevancies. Simply put, the fault relevancies provide the relevance of each fault in the HVAC system, which aids an operator in identifying the most relevant faults that need attention. More specifically, as indicated at 541, the processing of the CPM indicators and the raw data using the set of rules to generate the fault relevancies includes applying the set of rules to the CPM indicators and the raw data to generate symptoms that indicate faults in the HVAC system. At 542, the process maps the symptoms to the faults to generate a fault relevancy for each of the faults.

Operation 543 illustrates that the mapping process includes identifying symptoms that support a finding of a fault and symptoms that cancel a finding of the fault. As indicated at 544, the process of supporting a finding of the fault and the cancelling a finding of the fault generates a relevancy for the fault, and at 545, a most likely fault is selected by identifying a fault with the highest relevancy.

After the fault with the highest relevancy is identified, one or more of the fault relevancies are processed (550). At 551, the processing of the fault relevancies entails suppressing faults whose fault relevancies are lower than a threshold, and as indicated at 552, the processing the fault relevancies includes emphasizing faults whose fault relevancies exceed a threshold. At 553, the process identifies a course of action to address the faults whose fault relevancies exceed the threshold. At 554, the course of action includes transmitting a signal from a processor to a piece of equipment in the HVAC system. This signal can alter the operation of the piece of equipment. At 555, processing the fault relevancies includes visualizing the fault relevancies by plotting their time trends. An example of this can be seen in FIG. 3. At 556, a display is generated on a computer display device that illustrates the fault relevancies. Such a display permits identification of faults having fault relevancies either lower or higher than a threshold.

Figure 10:
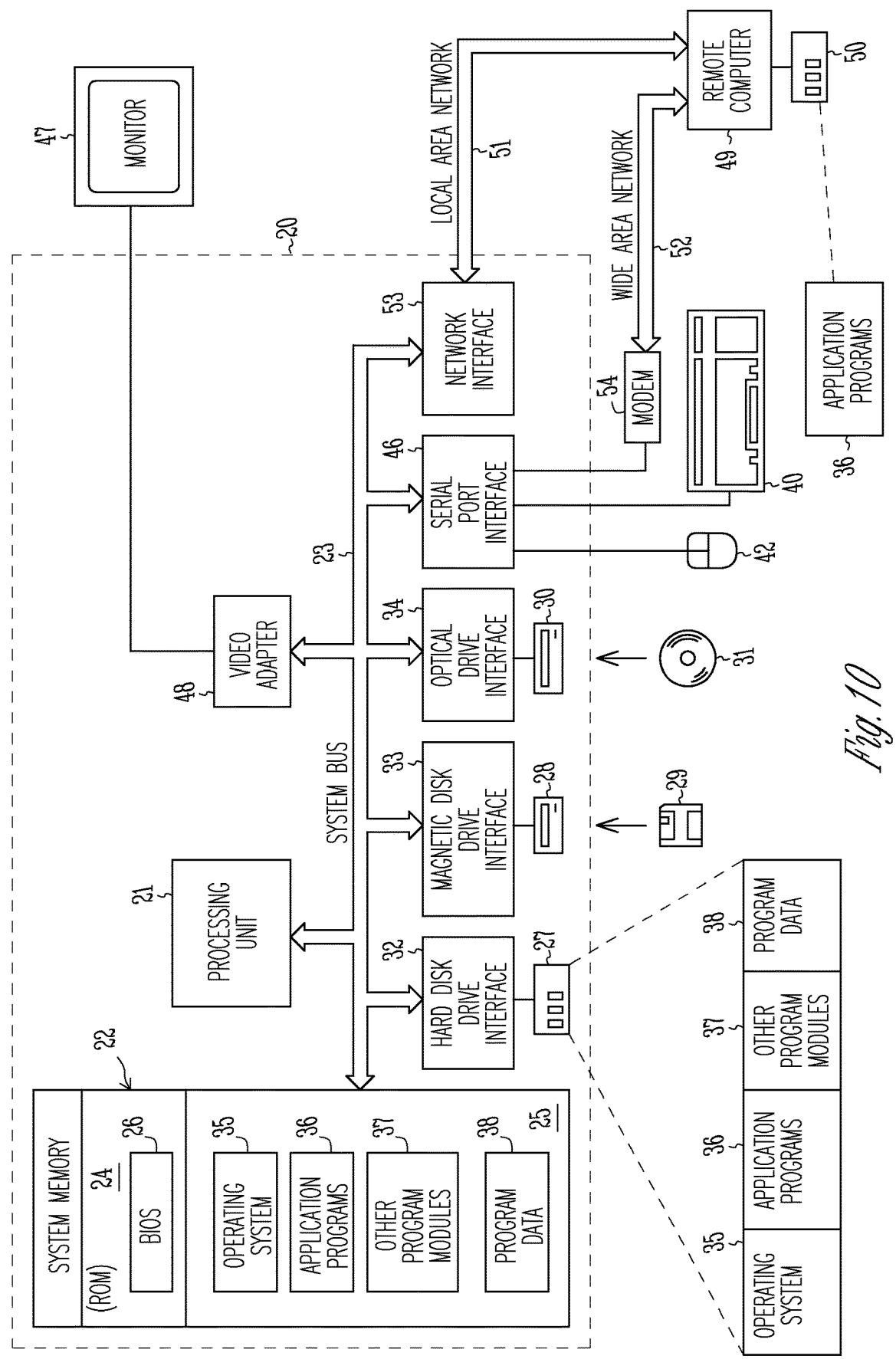
FIG. 10 is a block diagram illustrating a computer system upon which one or more embodiments of the current disclosure can execute.

FIG. 10 is an overview diagram of hardware and an operating environment in conjunction with which embodiments of the invention may be practiced. The description of FIG. 10 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 10, a hardware and operating environment is provided that is applicable to any of the servers and/or remote clients shown in the other Figures.

As shown in FIG. 10, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 10 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process to control and monitor a heating, ventilation, and air conditioning (HVAC) system that includes HVAC equipment, comprising:
   receiving raw data from an operation of a piece of HVAC equipment within the HVAC system;
   receiving controller performance monitoring (CPM) indicators that are associated with the performance of the control of the operation of the piece of HVAC equipment within the HVAC system;
   receiving a set of rules that are associated with the control of the operation of the piece of HVAC equipment within the HVAC system;
   determining whether one or more faults exist in the control of the operation of the piece of HVAC equipment within the HVAC system by applying the set of rules to the CPM indicators and the raw data to:
      identify supporting symptoms and cancelling symptoms that indicate faults in the control of the operation of the piece of HVAC equipment within the HVAC system;
      map the supporting symptoms and the cancelling symptoms to corresponding faults in the control of the operation of the piece of HVAC equipment within the HVAC system;
      determine one or more faults exists in the control of the operation of the piece of HVAC equipment within the HVAC system when the supporting symptoms that support a finding of a particular fault outweigh the cancelling symptoms that cancel a finding of the particular fault;
   generating a fault relevancy for each fault; and
   generating a display on a display that illustrates the faults and the fault relevancies in order to inform a user as to which fault should be attended to.

2. The process of claim 1, wherein the supporting symptoms that support a finding of the particular fault and the cancelling symptoms that cancel a finding of the particular fault influence the fault relevancy for a particular fault.

3. The process of claim 2, further comprising selecting a most likely fault by selecting the fault with a highest fault relevancy.

4. The process of claim 1, wherein the set of rules is further configured to identify faults that occur more frequently than other faults, that occur more consistently than other faults, or that are more severe than other faults.

5. The process of claim 1, wherein the CPM indicators comprise a definition of virtual points, and formulas employing the virtual points to define the symptoms.

6. The process of claim 5, wherein at least some of the formulas employing the virtual points to define the symptoms use multiple virtual points to define the symptoms.

7. The process of claim 1, wherein each of the faults is associated with an action to address the fault.

8. The process of claim 1, wherein the mapping between the supporting symptoms and the cancelling symptoms and the faults comprises defining supporting and cancelling symptoms for at least some of the faults.

9. The process of claim 1, further comprising processing the fault relevancies to suppress faults whose fault relevancies are lower than a threshold relevancy.

10. The process of claim 1, further comprising processing the fault relevancies to emphasize faults whose fault relevancies exceed a threshold relevancy.

11. The process of claim 10, further comprising identifying a course of action to address the faults whose fault relevancies exceed the threshold relevancy and displaying the course of action on the display.

12. The process of claim 11, wherein the course of action comprises transmitting a signal from a processor to a piece of equipment in the HVAC system, thereby changing the operation of the piece of equipment.

13. The process of claim 1, further comprising processing the fault relevancies to help visualize the fault relevancies by plotting their time trends and displaying the plotted time trends on the display.

14. The process of claim 1, wherein generating the display on the display permits identification of faults having fault relevancies either lower or higher than a threshold relevancy.

15. The process of claim 1, wherein the fault comprises an oscillation in the control of the piece of HVAC equipment.

16. The process of claim 1, wherein the fault comprises a fluctuation in the control of the piece of HVAC equipment.

17. The process of claim 1, wherein the fault comprises a predictable error in the control of the piece of HVAC equipment.

18. A non-transient, computer-readable medium comprising instructions that when executed by a processor executes a process to monitor the control of the operation of a piece of equipment within a heating, ventilation, and air conditioning (HVAC) system, the process comprising:
receiving raw data from the operation of the piece of HVAC equipment;
receiving controller performance monitoring (CPM) indicators associated with the performance of the control of the operation of the piece of HVAC equipment;
receiving a set of rules associated with the control of the operation of the piece of HVAC equipment;
determining whether one or more faults exists in the control of the piece of HVAC equipment of the HVAC system by applying the set of rules to the CPM indicators and the raw data to:
identify supporting symptoms and cancelling symptoms that indicate faults in the control of the piece of HVAC equipment of the HVAC system;
map the supporting symptoms and the cancelling symptoms to corresponding faults in the control of the piece of HVAC equipment of the HVAC system;
determine one or more faults exists in the control of the piece of HVAC equipment of the HVAC system when the supporting symptoms that support a finding of a particular fault outweigh the cancelling symptoms that cancel a finding of the particular fault; and
attending to the identified faults.

19. A system comprising:
a controller configured to control piece of equipment within a heating, ventilation, and air conditioning (HVAC) system;
wherein the controller is configured to:
determine whether one or more faults exist in the control of the operation of the piece of equipment of the HVAC system by:
identify supporting symptoms and cancelling symptoms that indicate faults in the control of the operation of the piece of equipment of the HVAC system;
map the supporting symptoms and the cancelling symptoms to corresponding faults in the control of the operation of the piece of equipment of the HVAC system;
determine one or more faults exists in the control of the operation of the piece of equipment of the HVAC system when the supporting symptoms that support a finding of a particular fault outweigh the cancelling symptoms that cancel a finding of the particular fault; and
attending to the identified faults.

* * * * *